United States Patent Office 3,409,623
Patented Nov. 5, 1968

3,409,623
CHLORINATED OXETANE POLYMER COATING COMPOSITION
Lester W. Smith, Berwick, Pa., assignor to ACF Industries, Incorporated, New York, N.Y., a corporation of New Jersey
No Drawing. Continuation-in-part of application Ser. No. 366,614, May 11, 1964. This application Mar. 5, 1965, Ser. No. 437,558
7 Claims. (Cl. 260—29.2)

ABSTRACT OF THE DISCLOSURE

A coating composition adapted for application to the interior of large vessels and railway tank cars comprises a dispersion of a finely divided chlorinated polyether polymer in an aqueous medium including water, a assurfactant, and an ester of a polyhydric alcohol such as ethylene glycol diacetate; the composition may also include a lower aliphatic alcohol and a water softener. A similarly suited primer coating composition comprises a dispersion of a finely divided chlorinated polyether polymer in a non-aqueous organic diluent, such as methylene chloride, a chlorinated aliphatic hydrocarbon, and an ester of a polyhydric alcohol. The composition is applied by maintaining the surface of the material to be coated above about 50° F., spraying the composition onto the surface and then drying and curing at a temperature between about 380° and 450° F., followed by cooling the coating.

---

This application is a continuation-in-part of copending application Ser. No. 366,614, filed May 11, 1964.

This invention relates to a novel system for the protective coating of metal surfaces with chlorinated polymers. More particularly, the invention concerns novel chlorinated polyether dispersions, and the methods of preparing and applying them to metals.

The protection of metal surfaces against corrosion and abrasion by materials and against mechanical injury by tools and other articles by which they are contacted is a problem of long standing in the process industries and in the transportation field. In industrial plants it is necessary to protect the surfaces, and particularly the interior surfaces, of storage and processing tanks, piping, ducts, pumps, meters, and other equipment, against these influences. A similar need for protection is found in manufacture and utilization of containers and tank cars for the transportation of solid and liquid commodities, such as chemicals, fats, oils, powders, food products, and the like. In both industry and transportation, the aim has been to provide a protective coating which would be resistant to a broad spectrum of materials, and which would at the same time withstand elevated temperatures, and present a smooth and dependably adherent film on the metal. This goal is of special importance in the tank car field, for in the mass transportation of materials, considerations of economy demand the use of large vessels, whether of tank car size or of less-than-carload dimensions. Since a broad range coating material has not heretofore been available in a form which would fully meet the requirements of corrosion and abrasion resistance and also possess the necessary ease of application, adherence to the metal substrate, resistance to shock and vibration and long service life, it has been necessary to employ special metals or special coatings to meet each type of service requirement.

A class of compounds which is characterized by chemical inertness, and which can be applied as a thick continuous adherent film which is resistant to abrasion, thermal shock, and mechanical injury, is represented by the chlorinated polyether polymers. Typical of this class of polymers is poly[3,3-bis(chloromethyl)-oxetane], which is sold commercially under the designation "Penton" by Hercules Powder Company, Wilmington, Delaware. These chlorinated polyether polymers are crystalline thermoplastic materials having a high chlorine content of about 45%, and a melting point above about 350° F., depending upon the degree of polymerization. The product known as Penton has a melting point of 375° F., and an average molecular weight between about 250,000 and 400,000.

Chlorinated polyether polymers are chemically inert and resistant to solvents at relatively high temperatures. In view of the small number of available solvents, such as, for example, cyclohexanone (all of which are such weak solvents that the solution produced is uneconomical and difficult to apply), it has been proposed to apply chlorinated polyether polymers as coatings by forming a suspension of fine particles of the polymer in an aqueous medium, applying the suspension to the metal, drying the suspension in place, and then fusing the resin to form a coating layer on the metal surface. In one coating system of this type, the resin is kept in suspension by means of a combination of a cationic flocculating agent, such as a long chain fatty amine and a binding agent, such as pectin or a starch derivative. However, in the known chlorinated polyether polymer coating systems, it has been difficult to obtain coatings of sufficient thicknesses and imperviousness to protect metal surfaces against corrosive agents for long periods of time.

In accordance with the invention, there are provided novel chlorinated polyether polymer dispersions which are characterized by ease of preparation and application, and a high degree of stability. The dispersions are capable of being applied to metal surfaces by conventional techniques, but are especially adapted to application by air spraying. The improved dispersions permit relatively thick coatings to be sprayed without running or sagging, they dry more readily in place on the metal surface, and after fusion they form continuous, strongly adherent, corrosion protecting films which possess long life, and which resist vibration and shock.

These characteristics are particularly significant in regard to the interior coating of large vessels and railway tank cars, which have not been coated successfully with chlorinated polyether polymers prior to the present invention.

The dispersion of the invention includes as its film forming component a chlorinated polyether polymer, which is selected so that its degree of polymerization and its melting point will assure the formation of a resinous film which will, upon curing, produce a hard, impervious, and adherent coating. The preferred chlorinated polyether polymer is that which is sold commercially under the designation "Penton," as previously indicated, but it is to be understood that while this polymer will be employed herein to illustrate the practice of the invention, the invention is not to be considered as limited thereto.

The chlorinated polyether polymer is employed in finely divided form, but the improved method of dispersion of the invention permits the use of the polymer in a less finely divided state than the minus 200 mesh particle size which has been characteristic of previously employed suspension producing methods. In the practice of the invention, the chlorinated polyether polymer is preferably utilized as a powder, the coarser particles of which all pass a U.S. Standard 60 mesh sieve, and the preponderance of which, namely preferably 60% or more, pass through a U.S. Standard 100 mesh sieve. It has been found, in accordance with the invention, that this particle size range facilitates the formation of stable dispersions employing the technique disclosed herein, but the particle size range is not to be regarded as critical, since finer sizes may be employed, if desired.

The chlorinated polyether polymer is available commercially in both the non-pigmented and pigmented forms, but for the purposes of the invention the non-pigmented form is preferred.

In accordance with the invention, there is employed as a dispersion medium, an aqueous vehicle including as its principal ingredients (a) a surfactant, (b) an alkaline water softener, (c) an ester of a polyhydric alcohol, and (d) water.

These ingredients are blended until a homogeneous solution is obtained. The amount of the alkaline water softener is selected so that the pH of the resulting solution is at least 7, although with some hard waters the value may rise somewhat above this figure.

The dry, finely divided chlorinated polyether polymer is added to the foregoing solution with thorough mixing until a homogeneous dispersion is obtained. Usually a period of about 10 to 20 minutes is sufficient.

While the surfactant serves to deflocculate the polymer and to aid in its dispersion, it was found, in accordance with the invention, that its action is greatly enhanced by the inclusion of the polyhydric alcohol ester. Although the action of the latter is not fully understood, it appears to exert a plasticizing action on the polymer, and, in conjunction with the surfactant, produces a smoothly flowing dispersion, which is capable of being sprayed, and which exhibits extraordinary stability on standing. Thus, less than 1% separation occurs when the dispersion is stored for extended periods and this separation is a supernatant liquid rising to the top which can be readily incorporated in the dispersion. It is this greatly improved dispersion which enables the wet coated film when applied to the metal surface to maintain its integrity to an extent heretofore unobtainable with any known chlorinated polyether film applied from suspension.

Another novel feature of the invention lies in the addition to the chlorinated polyether dispersion, immediately prior to spraying, of a volatile, water soluble organic diluent, whereby the drying of the wet film is controlled and facilitated, permitting the attainment of a dry film thickness as high as 40 mils or more, in contrast with the coatings of from 5 to 20 mils obtainable by known methods. This represents an important technological advance in comparison with known processes, and, for the first time, it makes possible the successful application of this type of polymer as a single coat, with its attendant advantages, in the coating of large surfaces, such as those of storage tanks and the interior of railway tank cars.

In the practice of the invention, the organic diluent is blended with the aqueous dispersion prepared as previously described, and the resulting mixture is applied to the metal by spraying or other means.

The surfactant is advantageously an anionic type surfactant, of which there are several well known types commercially available. It is chosen to leave as little residue as possible on curing. Preferably the surfactant is an ester of sodium sulfosuccinic acid, such as, for example, the dioctyl ester, which is sold commercially under the designation "Aerosol OT" (American Cyanamid Company, New York). Other types of anionic surfactants which may be employed include sodium salts of alkyl aryl sulfonates, such as these sold under the designation "Nacconol" (Allied Chemical Corp., New York) such as, for example $C_{12}H_{25}$—$C_6H_4$—$SO_3Na$; and sodium salts of sulfated alcohols, exemplified by sodium lauryl sulfate $$C_{12}H_{25}OSO_3Na$$

sold under various names such as "Gardinol," "Duponol," and the like.

The amount of surfactant required is not critical, and will generally lie in the range of about 0.0007 to about 0.08 part per 100 parts of water employed, said parts being by weight, and the surfactant being on the 100% solid basis.

The ester of a polyhydric alcohol is a water-miscible ester of ethylene glycol or of glycerol, with an organic carboxylic acid. Both diesters and triesters are contemplated. Thus, for example, there may be advantageously employed ethylene glycol diacetate, as well as the dipropionate and the dibutyrate. The preferred ester is ethylene glycol diacetate, a colorless liquid having approximately 10% water solubility. There may also be employed glyceryl diacetate (diacetin), and glyceryl tripropionate. The amount of ester will depend upon the desired film characteristics, but will generally lie between about 10 and 20 parts per 100 parts of water.

The water employed is advantageously distilled or deionized water, but even where water of this purity is employed, the contact of the sprayed dispersion will, on the surface of mild steel, produce some oxide formation. This may be minimized, and the alkalinity of the dispersion controlled, in accordance with the invention, by the inclusion of a water softener having an alkaline reaction, such as, for example, an alkali metal phosphate or carbonate. Suitable examples of water softeners include sodium hexametaphosphate, sodium metaphosphate, trisodium phosphate, and sodium tetraphosphate.

The preferred water softener is sodium hexametaphosphate, sold commercially under the designation "Calgon" (Calgon, Inc., Pittsburgh, Pa.). The amount employed may vary between about 0.05 and about 0.30 part per 100 parts of water present.

As indicated previously, the dispersion of the polymer, prior to application, as by spraying, is blended with a quantity of an organic water soluble diluent. The diluent is preferably a lower aliphatic alcohol which is more volatile than water, such as, for example, methanol, ethanol, isopropanol, and propanol. The amount of alcohol employed will generally lie between about 10 and about 50 parts per 100 parts of water present. The preferred alcohol is isopropanol.

Where the polymer dispersion is to be applied to the surface of an oxidizable metal such as steel, the surface is preconditioned and cleaned by sand or grit blasting.

The method of application of the polymer dispersion, in accordance with the invention, includes the steps of forming the dispersion, and spraying or otherwise applying the dispersion to the metal surface, which has been preconditioned by cleaning, and, if desired, by precoating with a primer.

The metal temperature is maintained above about 50° F. in order to assure smooth deposition, and the temperature of the polymer dispersion is maintained between about 65° F. and 80° F. The dispersion is applied until the desired wet film thickness has been built up, measurements being taken with a wet film gauge, and depressions made by the gauge are filled and smoothed.

The thus coated wet film is then dried and cured by heating the metal to a temperature between about 380° F. and about 450° F. for about 30 to 90 minutes. At the end end of the curing period, the metal is subjected to rapid cooling (quenching) to below about 200° F. within a limited period of time. Quenching imparts a glossy surface to the coating and tends to delay or retard crystallization, thus improving adhesion. Improper quenching results in a lack of adhesion and, consequently, an unsuccessful coating.

The dispersion of the invention may be applied by means of conventional air spraying techniques and equipment. The spray orifice size will be generally of the order of 0.05 inch. Thus, there may be employed a Binks No. 18 spray gun with a No. 66 PE air cap, and a Binks 63E fluid nozzle, orifice size 0.046″. A fluid pressure of about 20 p.s.i.g. and an atomizing pressure of about 30 p.s.i.g. are satisfactory and serve to exemplify the practice.

In accordance with another aspect of the invention, it has been found that the novel chlorinated polyether polymer coating compositions of the invention are most effectively applied to metal surfaces in conjunction with a novel solvent dispersed chlorinated polyether (Penton) primer. This primer, in conjunction with the coating composition, provides a coating system which exhibits greatly improved adhesion to metal surfaces, and which may be employed, when the primer is properly applied, to minimize the danger of the aqueous content of the system rusting or corroding the base metal. The primer may be applied by conventional spraying methods and fused at elevated temperatures so that the resin will form a total protective coating of good integrity. Subsequent application to the primer of the aqueous coating composition yields, upon fusion, a homogeneous film with no separation of coating layers. However, the use of the primer still necessitates proper preliminary surface preparation and conditioning.

The primer composition comprises a dispersion of a chlorinated polyether polymer (Penton) in a non-aqueous organic diluent. The diluent includes at least one chlorinated aliphatic hydrocarbon, examples of such diluents being trichloroethylene and methylene chloride. The diluent also includes an ester of a polyhydric alcohol, such as ethylene glycol or glycerol, with an aliphatic carboxylic acid. There may be advantageously employed ethylene glycol diacetate. The primer composition also includes a dispersing agent which is preferably of the anionic type, the preferred agent being an ester of sodium sulfosuccinic acid, such as, for example, the dioctyl ester, sold commercially under the designation "Aerosol OT" (American Cyanamid Corp., N.Y.).

In the formulation of the primer these ingredients are employed within the following approximate ranges, the amounts shown being stated in parts by volume.

Ingredients: Parts by volume
    Trichloroethylene _____ 250–350
    Methylene chloride _____ 40–60
    Ethylene glycol diacetate _____ 40–60
    Aerosol OT, 25% _____ 1–3

A preferred primer formulation is as follows:

Ml.
    Trichloroethylene _____ 300
    Methylene chloride _____ 50
    Ethylene glycol diacetate _____ 50
    Aerosol OT, 25% _____ 2

The foregoing preferred primer formulation contains from about 40–60% by weight of Penton powder, preferably about 50%. When applied to a smooth steel surface to form a 10–12 mil wet film, and fused for 30 minutes at about 380–450° F., it forms a 3.5–4 mil fused film, which is continuous, homogeneous, clear or silvery in appearance, with excellent adhesion as evidenced by bend, impact and knife adhesion tests and with no craters or pin holes to be seen under 20-power magnification. The fused dry film can be air cooled or water quenched without film shrinkage or pulling away from the metal. After quenching it may be coated directly with the chlorinated polyether coating composition of the invention previously described. The two coatings will fuse together in a homogeneous film without discontinuities and without any evidence of metal corrosion resulting from the aqueous character of the top coat. Total adhesion is excellent as indicated by bend, impact and knife tests.

The following examples serves to illustrate the practice of the invention, but are not to be regarded as limiting:

Example 1.—Preparation of chlorinated polyether top coat dispersion 750 grams of chlorinated polyether polymer (Penton) which were unpigmented, were ground to a fineness such that all passed through an 80 mesh sieve.

An aqueous solution was prepared having the composition:

Ml.
    Water _____ml__ 750
    Sodium hexametaphosphate (Calgon) __gm__ 1
    Ethylene glycol diacetate _____ml__ 75
    Aerosol OT (100% solid) _____gm__ 0.6

The Penton powder was gradually added to 600 ml. of this solution with vigorous stirring and a homogeneous dispesion was obtained. To the resulting dispersion were added with stirring 15 ml. of isopropyl alcohol, yielding a total volume of dispersion of approximately 750 ml. The dispersion thus obtained was ready for spray application.

Example 2.—Preparation of primer dispersion

A diluent mixture was prepared having the following composition:

Ml.
    Trichloroethylene _____ 300
    Methylene chloride _____ 50
    Ethylene glycol diacetate _____ 50
    Aerosol OT (25% clear) _____ 1.6

To 250 ml. of the above mixture there were added 200 grams of Penton powder, particle size minus 70 mesh, while stirring with the mechanical mixer. After settling for 72 hours, the proportion of supernatant liquid obtained was about 2%.

Example 3.—Application of coating system to tank car interior

The tank of a railway tank car was prepared for coating by first assuring that all welds were full, smooth and continuous and free from surface imperfections such as surface porosity, cracks, unfilled craters, overlaps, and sharp corners, burrs and edges. If necessary, the tank may be then heated for about 4 hours at a metal temperature of about 500° F.±50° F. to remove oil and foreign matter by volatilization, in a suitable oven. Thereafter, the interior of the tank, including all the surfaces to be coated, was blast cleaned to white metal using a suitable abrasive, and thereafter the tank was thoroughly cleaned of blast residues.

Immediately following blast cleaning, and before any rust could form, the interior of the tank was sprayed with the primer coat of Example 2, care being taken to remove beforehand any traces of condensed moisture. The tank was maintained at about 50° F. or over during primer application. After ventilation to remove solvent and coating vapors, the primer was cured by heating at 390° F., and inspected.

The polymer dispersion prepared for spraying as described in Example 1 was then sprayed on the primer with the Binks spray gun mentioned in Col. 4, connected to a pressure feed tank having a motor driven agitator. The temperature of the tank to be coated was maintained at 50° F. or higher and the dispersion temperature between 65° F. and 80° F. The dispersion was applied by repeated passes of spraying until an adequate wet film thickness had built up. Measurements of wet film thickness were made at intervals with a wet film gauge, and depressions made by the gauge were filled and smoothed. The wet film thickness of the coating averaged about 60 mils.

The wet film coating was dried and cured by oven heating. The oven was heated to maintain the tank at a temperature between 380° F. and 450° F. for a period of 75 minutes. No sagging, film degradation, discontinuities or bubbling were observed in the fused film after removal from the oven and quenching. The method of the invention has the advantage that additional coatings may be applied if desired to attain greater film thicknesses without any impairment of adhesion and other favorable properties.

At the end of the curing period, the tank was removed from the oven and rapidly quenched by a water spray applied to the exterior of the tank to cool it to below about 200° F., within a period of about 20 minutes after removal from the oven. When the exterior tank temperature was reduced to about 200° F., and the film was then below its softening temperature, water was sprayed directly on the film to complete the quenching. The quenching produced a glossy surface and retarded crystallization of the polymer.

Tank cars lined as described in Example 3 are in commercial use and provide superior corrosion protection with a greater variety of chemical ladings than has been previously achieved.

What is claimed is:

1. A coating composition comprising a dispersion of a finely divided chlorinated oxetane (polyether) polymer in an aqueous medium including water, from about 0.0007 to about 0.08 part per 100 parts of water of an anionic surfactant, an ester of a polyhydric alcohol with a lower aliphatic monocarboxylic acid in an amount between about 10 and about 20 parts per 100 parts of water, from about 0.05 to about 0.30 part per 100 parts of water of a water softener, and between about 10 and about 50 parts per 100 parts of water of a lower aliphatic alcohol which is more volatile than water.

2. The composition of claim 1 in which the ester is ethylene glycol diacetate.

3. The composition of claim 1 in which the alcohol is isopropyl alcohol.

4. The composition of claim 1 in which the surfactant is sodium dioctyl sulfosuccinate.

5. Method for the preparation of a sprayable chlorinated oxetane (polyether) polymer coating composition which comprises the steps of homogeneously dispersing a finely divided chlorinated oxetane (polyether) polymer in an aqueous medium including water, from about 0.0007 to about 0.08 part per 100 parts of water of a surfactant, an ester of a polyhydric alcohol with a lower aliphatic monocarboxylic acid in an amount between about 10 and about 20 parts per 100 parts of water, and from about 0.05 to about 0.30 part per 100 parts of water of a water softener, and then incorporating therewith between about 10 and about 50 parts per 100 parts of water of a lower aliphatic alcohol which is more volatile than water.

6. A coating composition comprising a dispersion of a finely divided chlorinated oxetane polymer in an organic liquid medium including from about 250 to about 350 parts by volume of trichloroethylene, from about 40 to about 60 parts by volume of methylene chloride, from about 40 to about 60 parts by volume of an ester of a polyhydric alcohol with a lower aliphatic monocarboxylic acid, and from about 1 to about 3 parts by volume of a 25% by weight solution of an anionic surfactant.

7. The composition of claim 6 in which the ester is ethylene glycol diacetate.

References Cited

UNITED STATES PATENTS

| | | | |
|---|---|---|---|
| 2,872,428 | 2/1959 | Schroeder | 260—29.2 |
| 2,947,722 | 8/1960 | Boardman | 260—31.6 |
| 3,061,566 | 10/1962 | Kass et al. | 260—29.2 |
| 3,205,207 | 9/1965 | Vandenberg | 260—29.2 |
| 3,242,115 | 3/1966 | McGary | 260—29.2 |

MURRAY TILLMAN, *Primary Examiner.*

J. C. BLEUTGE, *Assistant Examiner.*